United States Patent Office 3,228,924
Patented Jan. 11, 1966

3,228,924
POLYMERIZATION PROCESS AND CATALYST
Clifford W. Childers, Wayne, N.J., assignor to United States Rubber Company, New York, N.Y., a corporation of New Jersey
No Drawing. Filed Jan. 15, 1963, Ser. No. 251,486
18 Claims. (Cl. 260—94.3)

This invention relates to a catalyst for the polymerization of butadiene-1,3, hereinafter sometimes called butadiene, to a rubbery high molecular weight polybutadiene in which more than 75% of the monomer units have cis-1,4 structure, and to the polymerization of butadiene with such catalyst. The term high molecular weight polybutadiene refers to a polymer having a dilute solution viscosity of at least 0.1 in benzene which would correspond approximately to a number average molecular weight of at least 10,000.

The catalyst of the present invention is a mixture of bis-triphenylphosphine-cadmium iodide complex $(\phi_3P)_2CdI_2$ or bis-triphenylphosphine-zinc iodide complex $(\phi_3P)_2ZnI_2$, and an alkyl aluminum dihalide or a dialkyl aluminum halide or a mixture thereof. The alkyl aluminum dihalides and the dialkyl aluminum halides have the structural formulae R—Al—X$_2$ and R$_2$—Al—X, respectively, wherein R represents an alkyl group having 1 to 8 carbon atoms, e.g. methyl, ethyl, hexyl, octyl, and X represents a halogen, e.g. chlorine, bromine, iodine. Such alkyl aluminum dihalides and dialkyl aluminum halides may collectively be termed alkyl aluminum halides. The preferred alkyl aluminum halide in the catalyst mixture of the present invention is ethyl aluminum dichloride $CH_3CH_2AlCl_2$. The active catalyst mixture may be prepared by mixing the $(\phi_3P)_2CdI_2$ or $(\phi_3P)_2ZnI_2$ with the alkyl aluminum halide in an aromatic solvent, e.g. benzene, xylene, toluene, heating at a temperature of 75–90° C. for a period of 1 to 24 hours, and then cooling to room temperature. Longer heating time is not harmful. The mole ratio of aluminum to cadmium or zinc may be in the range of 5:1 to 20:1. The mole ratio of cadmium or zinc to aromatic solvent may be in the range of 0.00001:1 to 0.001:1. The polymerization may be carried out by adding the butadiene monomer directly to such a treated solution of the catalyst. The polymerization temperature is not critical and may be in the range of −20° C. to 100° C. The weight ratio of the butadiene to the benzene may be in the range of 1:20 to 1:1. The catalyst of the present invention is distinguished over previous cis-polybutadiene catalysts in that no compound of a transition metal of variable valence is required. Transition metal compounds in the catalyst residues must be removed after polymerization, since they have a harmful oxidative effect on the polymer. The cadmium or zinc compounds used in the catalysts of the present invention have no such harmful effect, and need not be removed.

The following examples illustrate the invention. All parts, percentages and ratios referred to herein, unless otherwise noted, are by weight.

*Example 1*

The bis-triphenylphoshine-cadmium iodide complex was prepared in known manner by first dissolving the cadmium iodide in the minimum amount of water necessary to dissolve it completely, and then adding this solution to ten times its volume of glacial acetic acid. A 20% solution of triphenylphosphine in glacial acetic acid was then added in the stoichiometric amount required to form the complex. The complex precipitated immediately as the two solutions were mixed, giving almost 100% yield based on the starting materials.

One gram (.008 mole) of $(CH_3CH_2)AlCl_2$ was mixed with 0.5 gram (.0005 mole) of $(\phi_3P)_2CdI_2$ in 200 ml. (2.3 moles) of benzene in a soda bottle of about 700 ml. capacity. The bottle was capped and heated to 80° C. for 16 hours with mild agitation. After 16 hours, the bottle was cooled to 25° C. and 20 g. (.37 mole) of dried liquid butadiene was added through the bottle cap (which had a self-sealing rubber gasket) by means of a hypodermic needle. After 24 hours at room temperature, one gram of rubbery high molecular weight polybutadiene was recovered by pouring the benzene solution into 800 ml. of methanol containing 0.1 g. of phenylbetanaphthylamine antioxidant. Structure of the polybutadiene as revealed by infrared analysis was 92% cis-1,4, 7% trans-1,4 and 1% 1,2 structure.

*Example 2*

The bis-triphenylphosphine-zinc iodide complex was prepared in the same manner as the bis-triphenylphosphine-cadmium iodide complex of Example 1 except zinc iodide was used instead of cadmium iodide. The yield was almost 100%.

This polymerization was the same as Example 1 except 0.42 gram (.0033 mole) of $CH_3CH_2AlCl_2$ was used instead of one gram, and 0.5 gram (.0006 mole) of $(\phi_3P)_2ZnI_2$ was used instead of 0.5 gram of $(\phi_3P)_2CdI_2$. About 0.2 gram of rubbery high molecular weight polybutadiene having 91% cis-1,4, 7% trans-1,4 and 2% 1,2 structure was obtained.

In view of the many changes and modifications that may be made without departing from the principles underlying the invention, reference should be made to the appended claims for an understanding of the scope of the protection afforded the invention.

Having thus described my invention what I claim and desire to protect by Letters Patent is:

1. A polymerization catalyst comprising an alkyl aluminum halide and material selected from the group consisting of $(\phi_3P)_2CdI_2$ and $(\phi_3P)_2ZnI_2$.

2. A polymerization catalyst comprising $CH_3CH_2AlCl_2$ and $(\phi_3P)_2CdI_2$.

3. A polymerization catalyst comprising $CH_3CH_2AlCl_2$ and $(\phi_3P)_2ZnI_2$.

4. A polymerization catalyst comprising an alkyl aluminum halide and material selected from the group consisting of $(\phi_3P)_2CdI_2$ and $(\phi_3P)_2ZnI_2$, the mole ratio of aluminum to the metal selected from the group consisting of cadmium and zinc being in the range of 5:1 to 20:1.

5. A polymerization catalyst comprising $CH_3CH_2AlCl_2$ and $(\phi_3P)_2CdI_2$, the mole ratio of aluminum to cadmium being in the range of 5:1 to 20:1.

6. A polymerization catalyst comprising $CH_3CH_2AlCl_2$ and $(\phi_3P)_2ZnI_2$, the mole ratio of aluminum to zinc being in the range of 5:1 to 20:1.

7. A process of preparing a reaction medium for the polymerization of butadiene-1,3 when added thereto which comprises heating an aromatic solvent containing an alkyl aluminum halide and material selected from the group consisting of $(\phi_3P)_2CdI_2$ and $(\phi_3P)_2ZnI_2$ at a temperature of 75–90° C. for 1 to 24 hours.

8. A process of preparing a reaction medium for the polymerization of butadiene-1,3 when added thereto which comprises heating benzene containing $CH_3CH_2AlCl_2$ and $(\phi_3P)_2CdI_2$ at a temperature of 75–90° C. for 1 to 24 hours.

9. A process of preparing a reaction medium for the polymerization of butadiene-1,3 when added thereto which comprises heating benzene containing $CH_3CH_2AlCl_2$ and $(\phi_3P)_2ZnI_2$ at a temperature of 75–90° C. for 1 to 24 hours.

10. A process of preparing a reaction medium for the polymerization of butadiene-1,3 when added thereto which comprises heating an aromatic solvent containing an alkyl aluminum halide and material selected from the group consisting of $(\phi_3P)_2CdI_2$ and $(\phi_3P)_2ZnI_2$ at a temperature 75–90° C. for 1 to 24 hours, the mole ratio of aluminum to the metal selected from the group consisting of cadmium and zinc being in the range of 5:1 to 20:1, and the mole ratio of the metal selected from the group consisting of cadmium and zinc to aromatic solvent being in the range of 0.00001:1 to 0.001:1.

11. A process of preparing a reaction medium for the polymerization of butadiene-1,3 when added thereto which comprises heating benzene containing $CH_3CH_2AlCl_2$ and $(\phi_3P)_2CdI_2$ at a temperature of 75–90° C. for 1 to 24 hours, the mole ratio of aluminum to cadmium being in the range of 5:1 to 20:1, and the mole ratio of cadmium to benzene being in the range of 0.00001:1 to 0.001:1.

12. A process of preparing a reaction medium for the polymerization of butadiene-1,3 when added thereto which comprises heating benzene containing $$CH_3CH_2AlCl_2$$

and $(\phi_3P)_2ZnI_2$ at a temperature of 75–90° C. for 1 to 24 hours, the mole ratio of aluminum to zinc being in the range of 5:1 to 20:1, and the mole ratio of zinc to benzene being in the range of 0.00001:1 to 0.001:1.

13. A process for producing a rubbery polymer of butadiene-1,3 which comprises contacting butadiene-1,3 with an aromatic solvent and a polymerization catalyst comprising an alkyl aluminum halide and material selected from the group consisting of $(\phi_3P)_2CdI_2$ and $(\phi_3P)_2ZnI_2$.

14. A process for producing a rubbery polymer of butadiene-1,3 which comprises contacting butadiene-1,3 with benzene and a polymerization catalyst comprising $CH_3CH_2AlCl_2$ and $(\phi_3P)_2CdI_2$.

15. A process for producing a rubbery polymer of butadiene-1,3 which comprises contacting butadiene-1,3 with benzene and a ploymerization catalyst comprising $CH_3CH_2AlCl_2$ and $(\phi_3P)_2ZnI_2$.

16. A process for producing a rubbery polymer of butadiene-1,3 which comprises contacting butadiene-1,3 with an aromatic solvent and a polymerization catalyst comprising an alkyl aluminum halide and material selected from the group consisting of $(\phi_3P)_2CdI_2$ and $(\phi_3P)_2ZnI_2$, the mole ratio of aluminum to the metal selected from the group consisting of cadmium and zinc being in the range of 5:1 to 20:1, and the mole ratio of the metal selected from the group consisting of cadmium and zinc to aromatic solvent being in the range of 0.00001:1 to 0.001:1.

17. A process for producing a rubbery polymer of butadiene-1,3 which comprises contacting butadiene-1,3 with benzene and a polymerization catalyst comprising $CH_3CH_2AlCl_2$ and $(\phi_3P)_2CdI_2$, the mole ratio of aluminum to cadmium being in the range of 5:1 to 20:1, and the mole ratio of cadmium to benzene being in the range of 0.00001:1 to 0.001:1.

18. A process for producing a rubbery polymer of butadiene-1,3 which comprises contacting butadiene-1,3 with benzene and a polymerization catalyst comprising $CH_3CH_2AlCl_2$ and $(\phi_3P)_2ZnI_2$, the mole ratio of aluminum to zinc being in the range of 5:1 to 20:1, and the mole ratio of zinc to benzene being in the range of 0.00001:1 to 0.001:1.

No references cited.

J. L. SCHOFER, *Primary Examiner.*